United States Patent

Murata et al.

[11] Patent Number: 5,160,361
[45] Date of Patent: Nov. 3, 1992

[54] METHOD OF MANUFACTURING OPTICAL ELEMENT

[75] Inventors: Jun Murata, Yao; Masaaki Sunohara, Nishinomiya; Takayuki Kimoto, Hirakata, all of Japan

[73] Assignee: Matsushita Electric Industrial Co., Ltd., Osaka, Japan

[21] Appl. No.: 712,710

[22] Filed: Jun. 10, 1991

[30] Foreign Application Priority Data

Jun. 13, 1990 [JP] Japan ................................. 2-154790
Nov. 19, 1990 [JP] Japan ................................. 2-313506

[51] Int. Cl.⁵ ............................................. C03B 23/00
[52] U.S. Cl. ............................................. 65/102; 65/31
[58] Field of Search ...................... 65/292, 102, 64, 61, 65/31, 355

[56] References Cited

U.S. PATENT DOCUMENTS

| | | | |
|---|---|---|---|
| 3,843,472 | 6/1974 | Toussaint | 65/31 |
| 4,481,023 | 11/1984 | Marechal | 65/64 |
| 4,629,489 | 12/1986 | Hirota | 65/76 |
| 5,015,280 | 5/1991 | Kimoto | 65/355 |
| 5,032,160 | 7/1991 | Murata | 65/102 |

FOREIGN PATENT DOCUMENTS

| | | |
|---|---|---|
| 78658 | 5/1983 | European Pat. Off. . |
| 316040 | 5/1989 | European Pat. Off. . |
| 3402648 | 8/1984 | Fed. Rep. of Germany . |
| 0000022 | 1/1979 | Japan ................................. 65/31 |
| 0171240 | 9/1985 | Japan ................................. 65/61 |
| 60-246231 | 12/1985 | Japan . |
| 0039001 | 2/1990 | Japan ................................. 65/102 |
| 2-120243 | 5/1990 | Japan ................................. 65/61 |

OTHER PUBLICATIONS

Patent Abstracts of Japan, 13 402 (C–633) (3750), Sep. 6, 1989.
Patent Abstracts of Japan, 13 595 (C–672) (3943), Dec. 27, 1989.
Patent Abstracts of Japan, 12 70 (C–479) (2917), Mar. 4, 1988.
Patent Abstracts of Japan, 10 120 (C–343) (2177), May 6, 1986.
Patent Abstracts of Japan, 9 124 (M–383) (1847) May 29, 1985.

Primary Examiner—Joye L. Woodard
Attorney, Agent, or Firm—Wenderoth, Lind & Ponack

[57] ABSTRACT

A method of manufacturing optical elements which is capable of obtaining optical elements at high accuracy by molding through employment of an optical element molding glass material preliminarily processed to prevent such defects as crack formation or chipping at the corner portions of the molding material which contact dies when the material is charged into the mold. An optical element molding glass material to be employed for the above method is formed with curvatures at boundary portions i.e. corner portions where its cylindrical portion contacts at right angles with its end flat portions by applying chemical etching, heat of a carbon dioxide gas laser or radiation heat to such corner portions. Meanwhile, in the manufacturing process of the optical element in which upper and lower dies and the preliminarily processed molding material are subjected to molding through heating and pressurization in a contacted state at all times, the molding pressure is arranged to be reduced at least one or reduced to zero to provide the optical element at high accuracy.

7 Claims, 4 Drawing Sheets

METHOD OF MANUFACTURING OPTICAL ELEMENT

BACKGROUND OF THE INVENTION

The present invention generally relates to optics and more particularly, to a process of manufacturing optics i.e. optical elements of high accuracy to be used for an optical disc device or the like.

Recently, in the manufacture of optics or optical elements (referred to as optical elements hereinafter), for example, lenses, prisms, etc., instead of polishing a raw material for the optical element such as glass or the like, there have been proposed various processes for molding the optical element by heating and pressurizing the raw material therefor charged in a metal mold. With respect to the glass raw material, although the process for molding under pressure by pouring the glass material in a molten state into the mold is the most efficient, such process is not suitable for the lens formation at high accuracy due to difficulty for controlling contraction of glass during cooling. Therefore, the general practice is such that the glass raw material preliminarily processed into a predetermined configuration is fed between dies for heating and subsequent molding through depression, as disclosed, for example, in Japanese Patent Laid-Open Publication Tokkaisho No. 58-84134.

In the case where a high precision lens is to be produced through molding by one time in the known practice as referred to above, it is necessary to preliminarily process the glass raw material for use in the molding, into a configuration as close to that of a desired lens as possible. Meanwhile, for restricting outer periphery of the lens, a barrel mold is normally employed for the molding, and in the above case, since there is no portion for relieving excessive glass, it is required to accurately keep weight of the glass raw material in agreement with that of the lens to be produced. For the above purpose, there has also been conventionally proposed, for example, in Japanese Patent Laid-Open Publication Tokkaisho No. 59-141435, a method for increasing an allowance in the weight matching of the glass through absorption of extra glass by providing a relief means at part of the barrel mold, and upper and lower dies. Meanwhile, it is also important to make the molded surface of the glass raw material as smooth as possible by effecting a preliminary processing for strictly controlling surface roughness of the glass material in order to obtain a lens with a smooth surface as disclosed in Japanese Patent Laid-Open Publication Tokkaisho No. 60-9716. In the known practices as referred to above, it is required to accurately control the weight of the glass raw material or to provide the relief means in the construction of the mold. However, when such relief means is provided in the construction of the mold, there is such a problem that the molded lens tends to have much portion optically ineffective, thus increasing the weight of the lens. On the other hand, the practice for accurately controlling the weight of the glass material is varied in various ways depending on how the configuration of the glass raw material is determined. By way of example, in the case where the shape of the glass raw material is formed into a glass pre-form approximated to a final product, there may arise such a problem that due to the difficulty in the preliminary processing, 3% of the weight results in a width of scattering, with a rise in cost. Accordingly, for accurately controlling the weight, the columnar shape which may be most easily subjected to preliminary processing at less cost is preferable, but due to the fact that a boundary edge or corner portion between a cylindrical portion of the columnar shape and its top flat face portion is at right angles, there is also a problem that such boundary portion of the molding raw material tends to be chipped during feeding thereof into the mold.

Another molding process taking the place of the polishing method is disclosed, for example, in Japanese Patent Laid-Open Publication Tokkaisho No. 60-246231. Referring to the drawings, the conventional molding method will be explained hereinafter.

Generally, when optical elements are produced by the press molding, the raw material for the optical elements is cut off to a predetermined size so as to be pre-heated close to a glass softening point. Subsequently, the optical element raw material thus pre-heated is fed between upper and lower dies so processed that the raw material is formed into a configuration generally the same as that of a finished optical element, e.g. a finished lens, when said raw material is subjected to mold clamping, thereby to effect pressure molding at a predetermined temperature.

Figure 1:
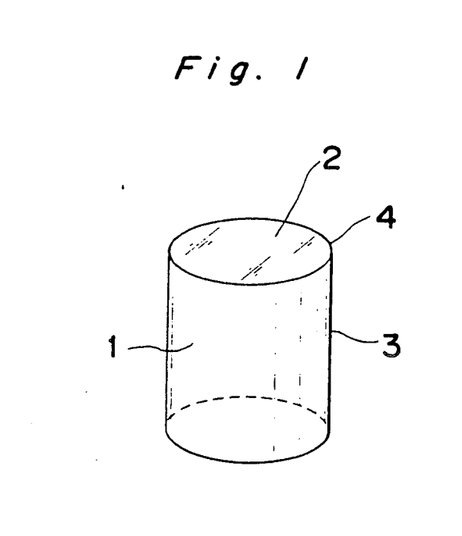
FIG. 1 is a perspective view of an optical raw material employed in embodiments according to the present invention.
Figure 8:
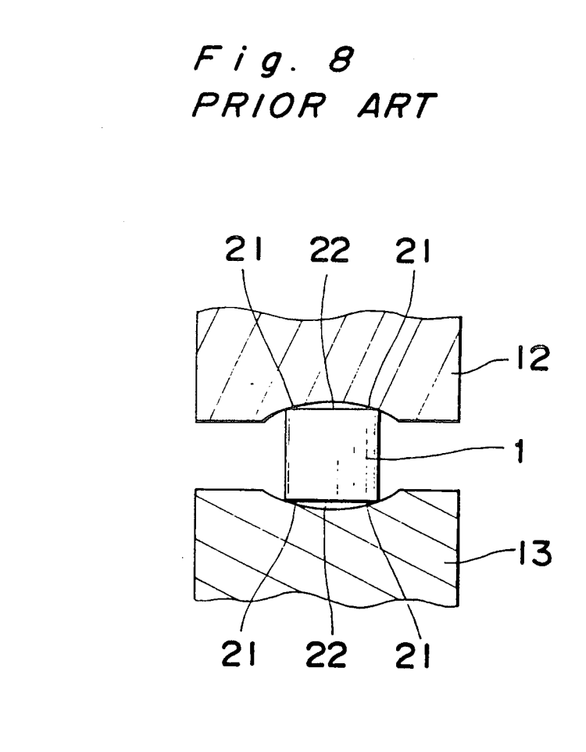
FIG. 8 is a schematic side sectional view for explaining relation between dies and raw material in the conventional process of manufacturing optical elements (already referred to).

The configuration of the optical element molding raw material should preferably be as simple as possible from the viewpoint of the manufacturing process or processing cost of the material, and for example, there is available a raw material 1 in a columnar shape as shown in FIG. 1 prepared by cutting off at a predetermined width, a rod-shaped raw material processed to have a predetermined outer diameter by a centerless processing. However, when the raw material prepared in the manner as described above is subjected to molding, the edge or corner portions 21 (referred to as corner portions hereinafter) or the raw material 1 are first deformed as shown in FIG. 8, and thus, the portions of the raw material 1 contacting an upper die 12 and a lower die 13 undesirably get to fit said upper and lower dies, thus forming closed spaces 22, which once formed continue to be present up to completion of the molding. Accordingly, the processing surfaces of the dies are not fully transferred onto the raw material 1, thereby resulting in a faulty lens.

Figure 7:
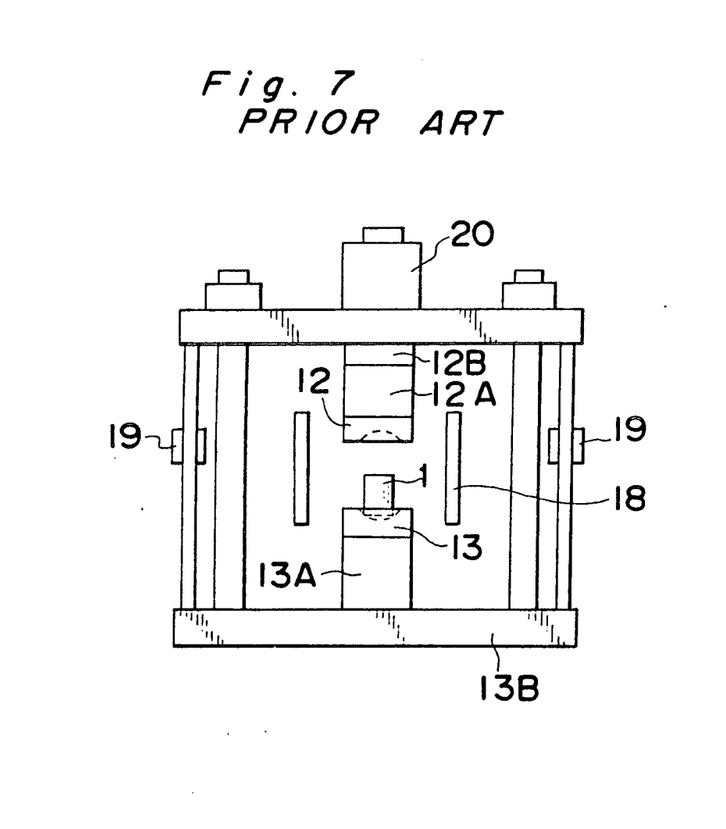
FIG. 7 is a side elevational view of an optical element molding apparatus for explaining conventional process of manufacturing optical elements (already referred to)

A conventional practice for preventing such insufficient transfer fault as referred to above will be explained hereinafter with reference to FIG. 7 showing construction of a known molding apparatus.

In FIG. 7, the molding apparatus is so arranged that a lower die 13 is fixed to a base 13B through a connecting rod 13A, while an upper die 12 is connected to a piston rod 12B through a connecting rod 12A. The optical element raw material 1 is adapted to be heated up to a molding temperature by a heater 18, and when the raw material 1 has reached a desired molding temperature, the upper mold 12 is lowered by hydraulic cylinders 19 to contact the raw material 1. Thereafter, the upper mold 12 is subjected to vertical vibration for pressurization, for example, by means of a servo-pulsar 20 mounted on the apparatus. Such vibrating pressurization is effected, e.g. up to 90% of the total stroke, for molding in the remaining 10% by a steady pressurization. Upon completion of the total pressurizing stroke, energization is suspended, and the mold is opened when the temperature is lowered to a desired level, thereby taking out the finished lens after cooling.

However, in the case where the molding is carried out through employment of the optical element molding raw material as described above, there may arise such defects as formation of cracks or chipping at the corner portions of the raw material which contact the dies when said raw material is charged into the mold. If the molding is effected under the state as described above, there have been many cases where broken raw materials damage the dies, configuration of the finished product becomes insufficient in accuracy or appearance of the finished product becomes poor due to remaining of broken raw materials on the surface of the molded optical element. Meanwhile, since the side face of the optical element forming raw material is a face of a centerless grinding process, the surface roughness thereof is comparatively large, due to consequent deterioration of the surface roughness at part of the optically effective face of the optical element, the transmittance thereof is undesirably deteriorated. Moreover, in the optical element manufacture by the above molding method, the upper die which determines the molded face of the optical element tends to involve air due to repeated contact with and spacing from the optical element in the process of molding, air bubbles are collected in the raw material in the course of molding. Furthermore, during the vibrating pressurization of said upper die, positional alignment with the lower die is very difficult, and therefore, it has been extremely difficult to keep inclination at opposite faces of the optical element within a designed tolerance. Additionally, since the upper die repeats the vibrating pressurization, temperature distribution tends to be non-uniform, with another temperature distribution occurring within the optical element also, and as a result, a mold sink is formed on the optical element, thus making it impossible to fulfill the optical performance.

SUMMARY OF THE INVENTION

Accordingly, an essential object of the present invention is to provide a method of manufacturing optical elements which is capable of obtaining optical elements at high accuracy by molding through employment of an optical element molding material preliminarily processed to prevent such defects as crack formation or chipping at the corner portions of the molding material which contact dies when said material is charged into the mold.

Another object of the present invention is to provide a method of manufacturing optical elements as described above which may be readily incorporated into a manufacturing process of the optical elements at low cost.

In order to accomplish these and other objects, according to the present invention, a curvature is provided at a boundary portion, i.e. edge or corner portion where a cylindrical portion of the optical element raw material of glass in a columnar shape contacts at right angles with its top flat face portion by applying chemical etching thereto or by heat or radiant heat of carbon dioxide gas laser, thereby to increase mechanical strength at such corner portion of the glass raw material. Therefore, the glass raw material may be charged into the mold without chipping at the corner portion, and thus, falling of broken pieces of the glass raw material into the mold can be prevented. When the chemical etching is adopted for providing the curvature at the corner portion, such curvature may be readily formed since the corner portion is subjected to the etching more quickly than other portions. Moreover, since a large amount of raw material can be immersed in an etching solution at one time, cost reduction may be achieved in this respect.

Meanwhile, when the carbon dioxide gas laser is used only for the corner portion of the raw material, since the wavelength thereof is in the vicinity of 10.6 $\mu$m, energy of the laser light is absorbed near the surface of the raw material so as to be converted into heat energy, and thus, the curvature may be effectively formed at the corner portion. Particularly, if the surface roughness at the flat face portion is set to be less than 0.1 $\mu$m, even in the case where the flat face portion is formed within the effective diameter of the optical element when the optical element molding raw material is to be press-molded, favorable transmittance may be obtained.

Furthermore, when a radius of curvature of the provided corner portion is set to be below 0.1 mm, there will be eliminated the possibility that the transmittance of the optical element is deteriorated due to the fact that part of the cylindrical portion having a coarse surface roughness constitutes part of the effective diameter portion of the molded optical element. More specifically, in the case where the radius of curvature of the corner portion of the raw material is formed to be smaller than 0.1 mm, since the amount of the part of the cylindrical portion with the large surface roughness to enter the flat face portion of the raw material is very small, such part of the cylindrical portion does not extend onto the effective diameter portion of the optical element after molding.

Moreover, in the manufacturing process of the optical element wherein the optical element raw material prepared by deforming the corner portion through preliminary processing of an optical element molding preliminary raw material, and simultaneously formed into a mirror face at its side face, is charged between the upper and lower dies for effecting heat pressurization for molding through heating and pressurization in the state where the raw material is held in close contact with the upper and lower dies at all times during the molding, effects as follows may be achieved by lowering pressure at least more than one time or reducing pressure to zero in the course of the molding by heating and pressurization.

Specifically, the effects are such that since the optical element forming raw material is formed with the radius of curvature of 0.1 mm at the corner portion thereof, the material contacts the dies through face contact when it is charged into the mold, no chipping or breakage takes place at said corner portion. Moreover, owing to the face contact, better heat conduction may be achieved as compared with that in the case where no curvature is provided at the corner portion, and thus, the time required until arrival at the state capable of pressure molding may be shortened. Additionally, since the temperature distribution within the optical element molding raw material is almost removed, contraction of glass during cooling becomes uniform for improved accuracy in the configuration of the optical element. Since the optical element molding raw material according to the present invention has the mirror face at the side face thereof, the transmittance of the optical element may be improved. Moreover, since the raw material is again subjected to the pressure molding after once reducing the molding pressure to zero at least more than one time in the course of molding, the space surrounded by the transfer face of the die and the end face of the raw material is eliminated, and thus, the shape of the die is favorably transferred onto the raw material, thereby to provide the optical element superior in optical performance.

More specifically, according to one preferred embodiment of the present invention, there is provided a method of manufacturing an optical element, which includes the steps of disposing an optical element molding glass material in a space between a first die and a second die confronting said first die, and obtaining the optical element such as a lens, prism or the like through molding by heating and pressurization. The optical element molding glass material in a columnar shape has a cylindrical portion and opposite end flat portions and formed, at each of its corner portions between said cylindrical portion and said end flat portion, with a radius of curvature larger than 0.05 mm by preliminarily applying physical or chemical processing to the corner portion of said optical element molding glass material, while the step for molding the optical element molding glass material by heating and pressurization is arranged to reduce pressure more than once or to reduce pressure to zero in the course of the molding.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Referring now to the drawings, the method of manufacturing an optical element molding material for the present invention will be explained.

In FIG. 1, there is shown an optical element molding preliminary raw material 1 in a columnar shape, which includes a cylindrical portion 3, and circular end flat portions 2 respectively connected to opposite ends of the cylindrical portion 3 at boundary portions i.e. corner or edge portions 4 (referred to as corner portions hereinafter). The cylindrical portion 3 has a surface roughness at 1.8 μm, while the end flat portions 2 both polished have a surface roughness at 0.05 μm.

First embodiment

Figures 2A, 2B, 2C:
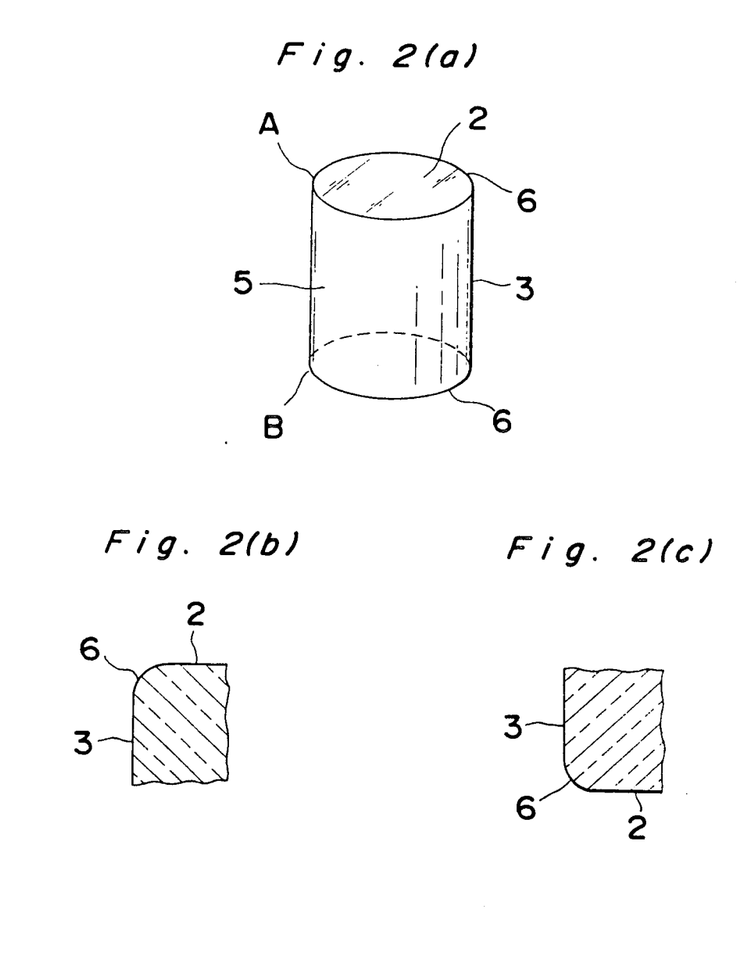
FIG. 2(a) is a perspective view of an optical element molding material according to one preferred embodiment of the present invention prepared by a chemical etching process.
FIGS. 2(b) and 2(c) are fragmentary cross sections, each showing on an enlarged scale, corner portions of the molding material of FIG. 2(a)

FIG. 2(a) shows an optical element molding material 5 prepared through employment of the optical element molding preliminary raw material 1 described above with reference to FIG. 1.

In FIG. 2(a), the molding material 5 has a curvature portion 6 formed at each of corner portions A and B between the cylindrical portion 3 and the end flat portion 2 according to the process of the present invention, and these curvature portions 6 are respectively shown in fragmentary sections on a large scale in FIGS. 2(b) and 2(c). The end flat portions 2 at the opposite ends maintain the surface roughness at 0.05 μm when polished. The molding material 5 made of optical glass SF8 has a diameter of 6 mm, a height of 10 mm, surface roughness at end flat portion of 0.1 μm, and surface roughness at the cylindrical portion of 1 μm.

The curvature portions 6 are each formed by the chemical etching. According to the present embodiment, a mixed solution of hydrofluoric acid, sulfuric acid and water at 1.5:1:0.5 (volume ratio) is prepared, and the etching is started when the temperature of the solution reaches 50° C. Although immersion of the optical element holding preliminary raw material 1 into the etching solution may be limited only to the corner portions 4 thereof, the raw material 1 was entirely immersed in the solution according to the present embodiment. The time for the immersion was set to be constant at 10 seconds, and the radii of curvature at the curvature portions 6 when the number of immersions was increased are shown in Table 1 given below.

TABLE 1

| Number of immersions | 2 | 3 | 4 | 5 |
|---|---|---|---|---|
| Radius of curvature (mm) at curvature portion | 0.02 | 0.03 | 0.04 | 0.04 |

As shown in Table 1, although the radius of curvature could be enlarged by the increase of the number of immersions, no variation thereof was noticed even when the immersion was effected more than 5 times. In the present embodiment, 500 pieces of the optical element molding preliminary raw materials were subjected to a batch treatment, and the radii of curvature were not affected at all even if the number of raw materials 1 was altered. Accordingly, by the present embodiment, the optical element molding materials with the curvature portions having the required radii of curvature less than 0.1 mm could be readily and stably formed. Moreover the surface roughness of the cylindrical portion after the etching process has been improved to 0.1 μm.

In Table 2 below, there are shown the result obtained by molding 1000 pieces of the optical element molding materials through the number of immersions of 4 times and the result obtained when 1000 pieces of the optical element molding materials were molded in the state having no curvatures at the corner portions without any processing.

TABLE 2

|  | No curvature at corner portion | With curvature at corner portion |
| --- | --- | --- |
| Optical element chipping occurrence rate (%) | 40 | 0 |
| Faulty performance optical element occurrence rate (%) | 35 | 0 |

As shown in Table 2, no faulty products were produced in the molding materials with curvatures at the corner portions, and moreover, since the surface roughness at the cylindrical portion was simultaneously improved by the etching processing, the possibility of deterioration in the transmittance and optical performance of the optical element was also removed.

Second embodiment

Figure 3:
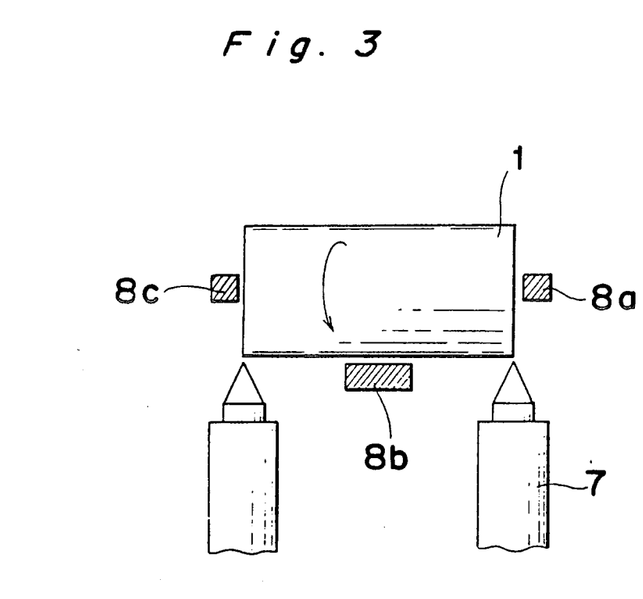
FIG. 3 is a schematic diagram showing a state for forming curvatures at corner portions of the optical element molding material employing carbon dioxide gas laser according to another embodiment of the present invention.

FIG. 3 shows a diagram representing a state where the curvature portions are formed through projection of the carbon dioxide gas laser onto the corner portions.

In FIG. 3, the preliminary raw material 1 is rotatably supported by holding members 8a, 8b and 8c. By inclining these holding members 8a, 8b and 8c, the preliminary raw material 1 is shifted through rotation, and therefore, the carbon dioxide gas laser 7 is also caused to slide at the same moving speed. The kind of glass employed for the preliminary raw material 1 is of SF6, with a diameter of 4 mm and a height of 10 mm. Table 3 below shows the laser output, number of revolutions of the optical element molding preliminary raw material, and radii of curvatures at the curvature portions according to the time for irradiation.

TABLE 3

| Laser output (W) | 20 | 20 | 20 | 40 |
| --- | --- | --- | --- | --- |
| No. of revolutions of raw material | 5 | 10 | 20 | 5 |
| Irradiation time (sec.) | 5 | 10 | 20 | 5 |
| Radius of curvature at curvature portion (mm) | 0.07 | 0.10 | 0.23 | 0.09 |

As is seen from the above Table 3, the radii of curvature at the curvature portions could be readily varied through variations of the laser output, number of revolutions of the raw material and irradiation time.

However, in the case where the radius of curvature was at 0.23 mm, the surface roughness of the cylindrical portion extended into the end flat portion of the optical element molding material 5 by 0.1 mm, and therefore, during press molding, the rough portion on the surface roughness of the cylindrical portion 3 extended into the effective diameter of the optical element, thus lowering the transmittance by about 10%.

In the optical element molding material 5 prepared in the other conditions than above, desired transmittance could be obtained.

Third embodiment

Subsequently, there will be shown the embodiment in which the curvature portions were provided by irradiation heat of an electric furnace.

Figure 4:
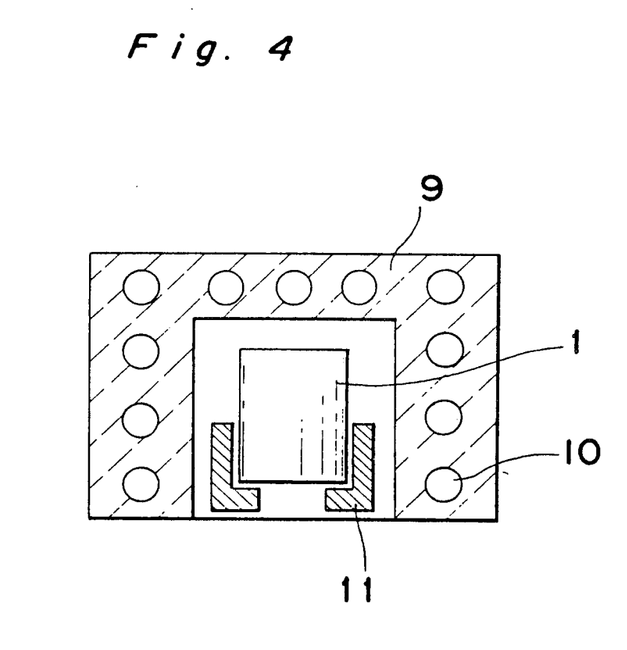
FIG. 4 is schematic cross section of an electric furnace for forming curvatures at corner portions of the optical element molding material according to a further embodiment of the present invention.

FIG. 4 shows a state where the curvature portions are formed through employment of the electric furnace.

In FIG. 4, there is shown a heating block 9 of a generally U-shaped cross section, and in walls of the heating block 9, heaters 10 are embedded, while in a space within the heating block 9, support members 11 for supporting the optical element molding preliminary raw material 1 are disposed. The preliminary raw material 1 placed on said support members 11 is fed for heating through a feeding port (not shown) of the electric furnace to form the curvature portions. The kind of glass for the preliminary raw material 1 is of SF8, with a diameter of 4.5 mm, a height of 5 mm, surface roughness at the flat portion of 0.1 μm, and surface roughness at the cylindrical portion of 1 μm.

The radii of curvature at the curvature portions according to the temperatures of the electric furnace and heating time in the above case are given in the Table 4 below.

TABLE 4

| Electric furnace temperature (°C) | 600 | 700 | 700 |
| --- | --- | --- | --- |
| Heating time (sec.) | 90 | 60 | 90 |
| Radius of curvature at curvature portion | 0.05 | 0.07 | 0.10 |

As shown in Table 4, when compared with the case where the radii of curvatures at the curvature portions are provided by the chemical etching and the heat of the carbon dioxide gas laser, although more time is required until the radius of curvature is formed, the practice of this third embodiment was much better in productivity than the two processes described earlier. Moreover, the surface roughness on the cylindrical portion after the processing was improved to 0.1 μm.

Table 5 below shows the result obtained by molding 1000 pieces of the optical element molding materials processed under the conditions of the electric furnace temperature at 700° C. and heating time for 60 seconds, and the result obtained by molding 1000 pieces of optical element molding materials having no curvatures at the corner portions without any processing.

TABLE 5

|  | No curvature at corner portion | With curvature at corner portion |
| --- | --- | --- |
| Optical element chipping occurrence rate (%) | 45 | 0 |
| Faulty performance optical element occurrence rate (%) | 37 | 0 |

As shown in Table 5, no faulty products were produced in the molding materials with curvatures at the corner portions, and moreover, since the surface roughness at the cylindrical portions was simultaneously improved by the preliminary processing, the possibility of deterioration in the transmittance and optical performance of the optical element was also removed.

As described so far, in any of the above embodiments, the curvature portions having the radii of curvatures of less than 0.1 mm could be stably and positively produced. Meanwhile, since the optical element molding material is increased in its mechanical strength at the boundary portions, the glass material may be fed into the molding dies without chipping at such boundary portions, and no broken pieces of glass were found within the dies.

Fourth Embodiment

Figure 5:
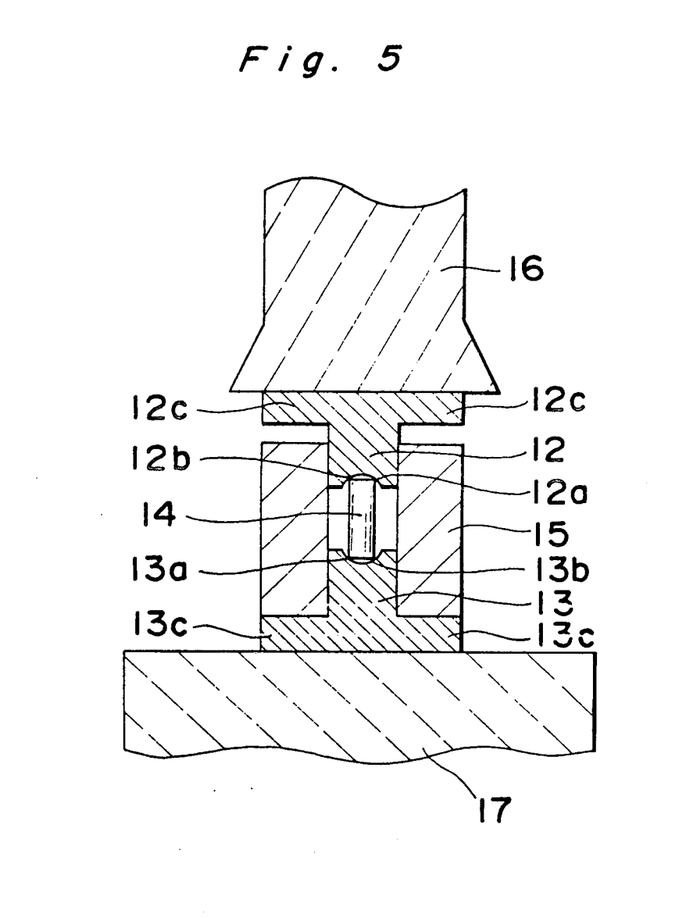
FIG. 5 is a fragmentary cross section of a molding apparatus for effecting the method of manufacturing the optical elements according to a still further embodiment of the present invention.
Figure 6:
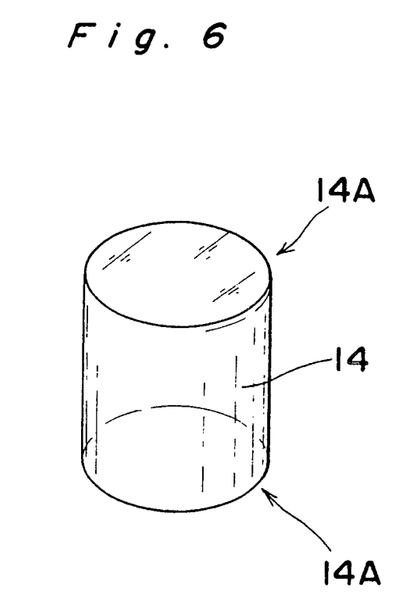
FIG. 6 is a perspective view of the optical element molding material employed in the embodiments of the present invention.

In FIG. 5 for the fourth embodiment, there is shown another molding apparatus for effecting the process of manufacturing optical elements according to the present invention. This molding apparatus includes an upper die 12, a lower die 13, and a barrel die 15 suitably adjusted in its height so as to remove deviation in the axes between said upper die 12 and lower die 13 and also to achieve a predetermined thickness of the optical element, with an optical element molding material 14 being fed into a space defined by the upper and lower dies 12 and 13 and the barrel die 15. The optical element molding preliminary raw material 14 is of the columnar shape described earlier, and its side face has the surface roughness of about 10 $\mu$m by the centerless processing, with the opposite end faces thereof being polished into a mirror face. The preliminary raw material 1 is thermally process, at its corner portions 14A for the opposite ends, to have required curvatures through heat processing at predetermined temperatures for a specific time by an electric furnace, and the side face of the optical element molding material 14 prepared by the above heat processing is formed into the mirror face. The molding material 14 thus prepared is fed into the mold so that the opposite end faces thereof contact transfer faces 12a and 13a of the upper and lower dies 12 and 13. On a flange portion 12c of the upper die 12, a pressurizing stage 16 incorporated with a heating means (not shown) is disposed so as to receive a depressing force from a hydraulic pump or the like (not shown). The depressing force for the pressurizing stage 16 is arranged to be reduced to any desired pressure or the zero in the course of molding. The lower die 13 is placed, at its bottom flange portion 13c on a stationary molding stage 17 also incorporated with a heating means (not shown).

Subsequently, the process for molding the molding material 14 through employment of the molding apparatus arranged as described above will be explained hereinafter.

For the present embodiment, a columnar material of optical glass SF8 having a diameter of 6 mm$\phi$ and a height of 6 mm was used for the optical element molding material. The radius of curvature of 0.1 mm was obtained when the heat processing conditions were set at 500° C. for 30 minutes, with the surface roughness at the side face becoming 0.1 $\mu$m. The radius of curvature at the corner portion 14A should preferably be larger than 0.05 mm, since if it is smaller than 0.05 mm, there is a possibility that chipping takes place when the molding material 14 is charged into the dies or the upper die is brought into contact with the molding material. Meanwhile, if it is intended to make the radius of curvature larger than 1 mm, the time required for the heat processing becomes very long, thus not being suitable for mass production. It has been made clear that if the surface roughness at the side face of the glass material is less than 0.5 $\mu$m, the transmittance and optical performance of the optical element is not affected. At a central portion on each of the end faces of the optical element molding material 14, a flat portion remains. Such molding material 14 is charged vertically onto the lower die 13 for contact with the transfer face 13a, and after applying the barrel die 15 onto the lower die 13, the upper die 12 is inserted along the barrel die 15 for contact with the molding material 14. In this case, spaces 12b and 13b surrounded by the transfer faces 12a and 13a of the dies 12 and 13 and the end faces of the molding material 14 are formed. Thereafter, the heating means is energized to heat the molding material up to 530° C. After some time upon arrival at 530° C., viscosity of the molding material reaches $10^{10}$ poise. Then, pressure is applied to the pressurizing stage 16 and the upper die 12 starts depressing the molding material 14. At this time, the pressure should preferably be over 2 kg/mm$^2$. In the total pressurizing stroke 5 mm until the flange portion 12c of the upper die 12 is brought into contact with the end face of the barrel die 15, the pressurization is once stopped upon depression up to 2.5 mm, and the pressurizing stage 16 is raised to be spaced from the upper die 12 so as to reduce the pressure down to zero. Even when the pressure is reduced to zero, the upper and lower dies 12 and 13 and the molding material 14 are held in close contact with each other. At this time, the viscosity of the molding material 14 has reached $10^9$ poise. Meanwhile, the spaces 12b and 13b surrounded by the die transfer faces 12a and 13a and the end faces of the molding material 14 and held in a positive pressure, return to be in normal pressure. Subsequently, after bringing the pressurizing stage 16 into close contact with the upper die 12, pressurization is again started for molding up to the total pressurizing stroke of 5 mm. At this time, the spaces 12b and 13b are completely eliminated and the shape of the die transfer face has been fully transferred onto the optical element molding material 14. Thereafter, energization is suspended, and the molding material 14 is cooled down to 430° C. in the pressurized state for subsequent removal of pressure to zero. Then, the mold is opened upon arrival at the room temperature for taking out the optical element. The molded optical element had the chipping occurrence rate at 0%, with a favorable performance as the optical element.

It should be noted here that, in the foregoing embodiment, although the pressure was reduced to zero in the course of molding, the practice may be modified only to reduce pressure, since returning to the normal pressure may be achieved only through pressure reduction depending on the kind and size of the optical element molding material. It is necessary that the conditions for the heat processing to prepare the optical element molding material are properly altered depending on the kind of the raw material. Moreover, the mirror face is required for the end faces of the optical element molding material, and a cross section having a surface roughness equivalent to that of the polished face may be utilized for the purpose.

It should also be noted that, in the foregoing embodiments, although the optical element molding material of the columnar shape is employed, the shape of the molding material is not limited to be the columnar shape, but may be in a rectangular parallelepiped shape, cubic shape or the like for facilitation of processing.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method of manufacturing an optical element, which comprises the steps of disposing an optical element molding glass preform in a space between a first die and a second die confronting said first die, and obtaining the optical element through molding by heating and pressurization, said optical element molding glass preform having a columnar shape with a cylindrical portion and opposite end flat portions and forming, at each of its edges between said cylindrical portion and opposite end flat portions a radius of curvature larger than 0.05 mm by applying physical or chemical processing to the edges of said optical element molding glass preform, said step for molding the optical element molding glass preform by heating and pressurization being performed so as to reduce molding pressure more than once or so as to reduce said molding pressure to zero during molding.

2. The method of manufacturing an optical element as claimed in claim 1, wherein the optical element molding glass preform to be molded through heating and pressurization is given a radius of curvature at each of its edges by heating the edges through irradiation with a laser beam from a carbon dioxide gas laser, onto said edges of the optical element molding glass preform.

3. The method of manufacturing an optical element as claimed in claim 1, wherein the optical element molding glass preform to be molded through heating and pressurization is given a radius of curvature at each of its edges by radiation heat based on atmospheric temperature by deploying said optical element molding glass preform into a space in which the temperature of the atmosphere is maintained in the vicinity of the Tw point (working point) of said glass preform.

4. The method of manufacturing an optical element as claimed in claim 1, wherein the optical element molding glass preform to be molded through heating and pressurization is given a radius of curvature at each of its corner portions by chemical etching.

5. The method of manufacturing an optical element as claimed in claim 1, wherein the optical element molding glass preform to be molded through heating and pressurization is given a radius of curvature at each of its edges by radiation heat based on atmospheric temperature by deploying said optical element molding glass preform into a space in which the temperature of the atmosphere is maintained in the vicinity of the Tw point (working point) of said glass preform, and simultaneously, surface roughness at the side face of the cylindrical or columnar optical element molding glass preform is improved to be less than 0.5 $\mu$m.

6. The method of manufacturing an optical element according to claim 1 wherein said optical element is a lens or prism.

7. The method of manufacturing an optical element as claimed in claim 1, wherein the optical element molding glass preform to be molded through heating and pressurization is given a radius of curvature at each of its edges by chemical etching, and simultaneously, surface roughness at the side face of the cylindrical or columnar optical element molding glass preform is improved to be less than 0.5 $\mu$m.

* * * * *